(12) United States Patent
Packirisamy et al.

(10) Patent No.: US 10,579,313 B1
(45) Date of Patent: Mar. 3, 2020

(54) METHOD AND APPARATUS FOR RELEASING A SECURE PRINT JOB BETWEEN USERS

(71) Applicant: XEROX CORPORATION, Norwalk, CT (US)

(72) Inventors: Vinothraja Packirisamy, Thiruvarur (IN); Vijayanand Sakthivel, Erode (IN); Arun Vengat Srinivasan, Chennai (IN)

(73) Assignee: ZEROX CORPORATION, Norwalk, CT (US)

(*) Notice: Subject to any disclaimer, the term of this patent is extended or adjusted under 35 U.S.C. 154(b) by 0 days.

(21) Appl. No.: 16/364,828

(22) Filed: Mar. 26, 2019

(51) Int. Cl.
  *G06F 3/12*   (2006.01)
  *H04N 1/00*   (2006.01)
  *H04L 29/06*  (2006.01)

(52) U.S. Cl.
  CPC .......... *G06F 3/1238* (2013.01); *H04L 63/083* (2013.01); *H04L 63/101* (2013.01); *H04N 1/00854* (2013.01); *H04N 1/00859* (2013.01); *H04N 1/00875* (2013.01)

(58) Field of Classification Search
  CPC .............................. G06F 3/1238; H04L 63/083
  See application file for complete search history.

(56) References Cited

U.S. PATENT DOCUMENTS

| | | | |
|---|---|---|---|
| 8,169,633 B2 | 5/2012 | Aikens et al. | |
| 8,665,463 B2 | 3/2014 | Salgado et al. | |
| 8,705,064 B2 | 4/2014 | Ellis | |
| 2010/0007907 A1 | 1/2010 | Aikens et al. | |
| 2010/0208287 A1* | 8/2010 | Hanaoka | G06F 21/608 358/1.15 |
| 2011/0061008 A1 | 3/2011 | Gupta et al. | |
| 2015/0237219 A1* | 8/2015 | DeRoller | H04N 1/001 358/1.14 |
| 2016/0286085 A1* | 9/2016 | Wagatsuma | H04N 1/4413 |

* cited by examiner

*Primary Examiner* — Ibrahim Siddo
(74) *Attorney, Agent, or Firm* — Jones Robb, PLLC

(57) ABSTRACT

Systems, methods, and devices are configured to release a secure print job between users. They include receiving a print job associated with an electronic document created by a primary user, the print job comprising instructions for secure print authentication by a secondary user. They also include providing access by the secondary user to a print list comprising a subset of secure print jobs comprising the print job created by the primary user and providing the secondary user with an alternate access mechanism for the secure print authentication for printing the electronic document as part of the print job created by the primary user based on a relationship between the primary user and the secondary user. They also include providing instructions to print the electronic document when the secondary user has completed the alternate access.

20 Claims, 9 Drawing Sheets

METHOD AND APPARATUS FOR RELEASING A SECURE PRINT JOB BETWEEN USERS

TECHNICAL BACKGROUND

Networked printer systems allow a user to submit a print job for an electronic document to a printer queue or server that can subsequently be printed using one of a large number of different printers. The arrangement allows a user to walk to any one of the supported printers and select the job to be printed. In some arrangements, a secured printing option or mechanism may be available for use with some or all print jobs submitted to the different printers. A secured printing mechanism may include requiring a user to create and submit a print job, go to the printer, access the print job, and release the held print job to be printed. The release of the print job may be accomplished by use of a smart card, an internet or web address login, or some other form of local authentication. Typically, the authentication and release mechanism is unique to each user and permits the user to prevent other users from releasing and printing any secure print jobs held in the printing queue that does not belong to them.

The need to maintain unique and private authentication and release mechanisms for each user a part of printing electronic documents does create some drawbacks. In general, only the user that creates or requests a secure print job can access the secure print job and print the electronic document at a printer. In some instances, if the user that created the secure print job is not available to go to the printer to print the electronic document when printing is needed, then the user may need to either share his/her authentication and release mechanism or share the source file for the electronic document with another user so that the other user may create a print job. Sharing authentication and release mechanisms between users may create future security issues and may further be against business policy. Additionally, sharing the source file with another user to have that user create the print job, using a mechanism such as through email, server sharing, direct copy or any other method of file transfer, creates additional use of resources and leaves the responsibility for properly setting up the secure print job and printing the electronic document with the other user. Therefore, there is a need to address the issues associated with authentication and release mechanisms for printing electronic documents when a user prints an electronic document as part of a secure print job.

Overview

Exemplary embodiments described herein include methods, systems, and apparatuses for releasing a secure print job between users. An exemplary method includes receiving a print job associated with an electronic document created by a primary user, the print job including instructions for secure print authentication by a secondary user. The method further includes providing access by the secondary user to a print list including a subset of secure print jobs, the subset including the print job created by the primary user and sending a print job release request notification to the primary user when the secondary user selects the print job created by the primary user. The method also includes providing the secondary user with an alternate access mechanism for the secure print authentication in response to the print job request notification sent to the primary user, the alternate access mechanism for printing the electronic document as part of the print job created by the primary user based on a relationship between the primary user and the secondary user and providing instructions to print the electronic document as part of the print job when the secondary user has completed the alternate access mechanism for the secure print authentication.

An exemplary printing apparatus includes a network interface that receives a print job associated with an electronic document created by a primary user, the print job including instructions for secure print authentication by a secondary user. The printing apparatus further includes a user interface that provides access by the secondary user to a print list including a subset of secure print jobs, the subset including the print job created by the primary user. The printer apparatus additionally includes a print processor that generates a print job release request notification to send to the primary user through the network interface when the secondary user selects the print job created by the primary user, the print processor further providing an alternate access mechanism for secure print authentication by the secondary user for printing the electronic document as part of the print job created by the primary user based on an association between the primary user and the secondary user. The printing device also includes a printing engine that prints the electronic document as part of the print job created by the primary user when the secondary user has completed the alternate access mechanism for secure print authentication.

An exemplary apparatus includes a memory for storing information for a print job created by a primary user and an associated electronic document, the print job comprising instructions for secure print authentication by a secondary user. The apparatus also includes a processor configured to provide access by the secondary user to a print list comprising a subset of secure print jobs, the subset comprising the print job created by the primary user. The processor is further configured to provide the secondary user with an alternate access mechanism for secure print authentication for printing the electronic document as part of the print job created by the primary user based on a relationship between the primary user and the secondary user.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
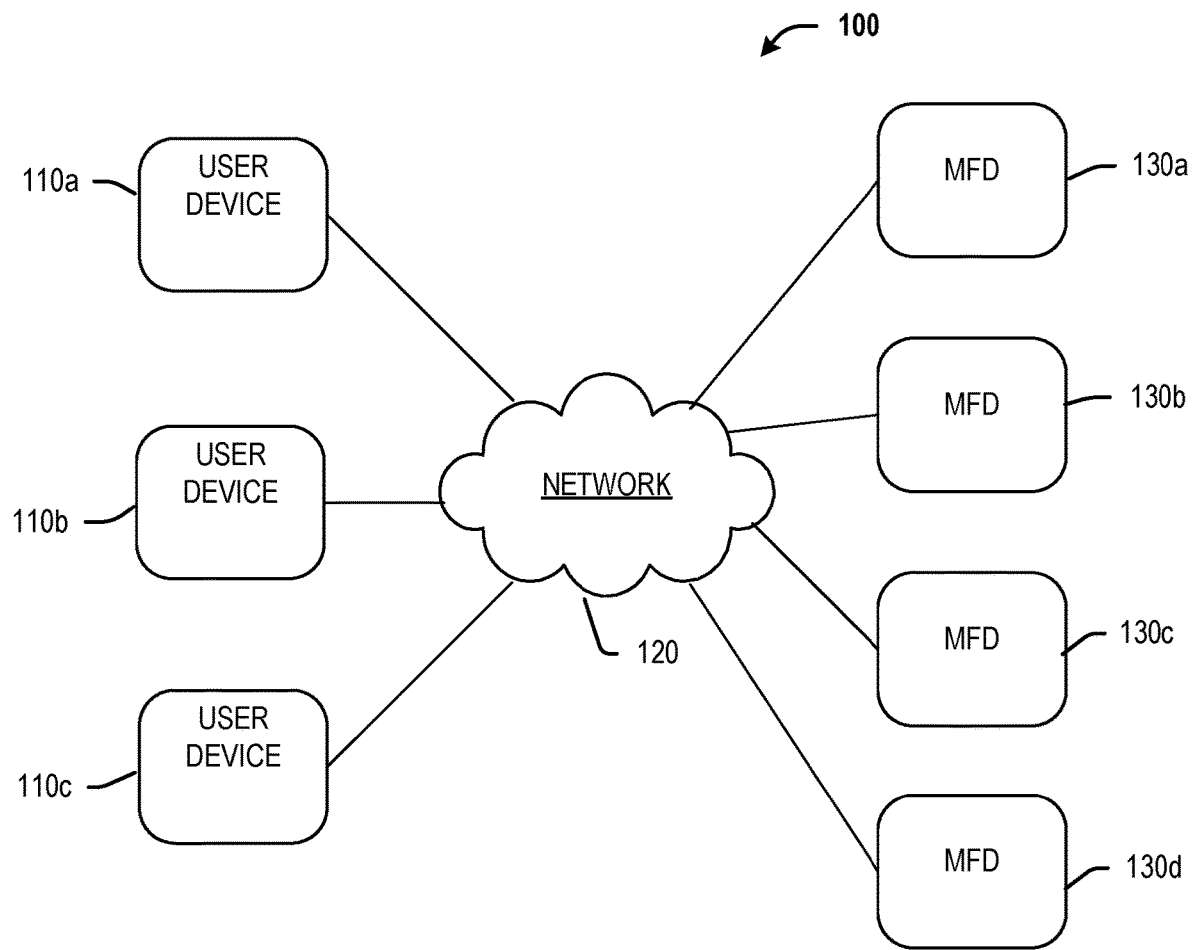
FIG. 1 depicts an exemplary system for releasing a secure print job between users.

It should be understood that the drawing(s) are for purposes of illustrating the concepts of the disclosure and are not necessarily the only possible configuration for illustrating the disclosure.

DETAILED DESCRIPTION

In some embodiments described herein, a method or process is described that utilizes a mechanism for releasing a secure print job between users. The method includes receiving a print job associated with an electronic document created by a primary user, the print job including instructions for secure print authentication by a secondary user. The method further includes providing access by the secondary user to a print list including a subset of secure print jobs. The subset includes the print job created by the primary user. The method also includes sending a print job release request notification to the primary user when the secondary user selects the print job created by the primary user. The method additionally includes providing the secondary user with an alternate access mechanism for the secure print authentication based on the secured print job release request notification sent to the primary user, The alternate access mechanism for printing the electronic document as part of the print job created by the primary user based on a relationship between the primary user and the secondary user and providing instructions to print the electronic document as part of the print job when the secondary user has completed the alternate access mechanism for the secure print authentication. The method or process may additionally include other aspects and mechanisms of the present disclosure as described herein.

In some embodiments, the print job further includes instructions for a secure access mechanism by the primary user that is different from the alternate access mechanism. For example, the secure access mechanism may be a private passcode unique to the primary user.

In some embodiments, the method or process may include determining if the secondary user is an authorized user for printing on a printer chosen by the primary user. In some instances, the subset of secured print jobs may include all secure print jobs on the printer when it is determined that the secondary user is an authorized user. Each of the secure print jobs may also be displayed for selection with primary user information. Alternatively, the subset may include secured print jobs enabled for printing by authorized users when it is determined that the secondary user is not an authorized user. In some instances, the secured print jobs may be displayed for selection with no information associated with the primary user.

In some embodiments, the method or process may include determining if the secondary user is included in a first list of pre-approved additional users for printing electronic documents as part of print jobs created by the primary user. The primary user may create one or more lists or groups of pre-approved users as part of a general printing authorization profile associated with the primary user or as part of an authorization profile on a specific printer. In some instances, the print job release request notification is sent to the primary user when it is determined that the secondary user is not included in the first list. Further, the print job release request notification may include identification information for the secondary user when it is determined that the secondary user is not an authorized user.

In some embodiments, the relationship between the primary user and the secondary user may encompass including the secondary user in a second list of pre-approved additional users for printing print jobs created by the primary user. In some instances, the alternate access mechanism for secure print authentication may be provided to the secondary user when the secondary user is not included in the second list. Alternatively, the print job release may be provided to the secondary user without an alternate access mechanism for secure print authentication when the secondary user is included in the second list.

In some embodiments, the method or process may further include providing a print job release to the secondary user without an alternate access mechanism for secure print authentication when the secondary user is included in either the first list or the second list.

In some embodiments described herein, a printing apparatus may be included to perform one or more aspects of the disclosure described by the various embodiments herein. The printing apparatus includes a network interface that receives a print job associated with an electronic document created by a primary user, the print job including instructions for secure print authentication by a secondary user. The printing apparatus also includes a user interface that provides access by the secondary user to a print list including a subset of secure print jobs, the subset including the print job created by the primary user and a print processor that generates a print job release request notification to send to the primary user through the network interface when the secondary user selects the print job created by the primary user. The print processor further provides an alternate access mechanism for secure print authentication by the secondary user for printing the electronic document as part of the print job created by the primary user based on a relationship between the primary user and the secondary user. The printing apparatus further includes a printing engine that prints the electronic document as part of the print job created by the primary user when the secondary user has completed the alternate access mechanism for secure print authentication. The printing apparatus may include additional electrical elements used in conjunction with general electronics and printing technology as well as specific electrical elements necessary for operation in specific types of wired and/or wireless communication networks. The print processor further may include one or more processors as well as other elements necessary to perform the various operations as described herein.

In some embodiments described herein, an apparatus may be included to perform one or more of the aspects of the disclosure described by the various embodiments herein. The apparatus includes a memory for storing information for a print job created by a primary user and an associated electronic document, the print job including instructions for secure print authentication by a secondary user. The apparatus further includes a processor configured to provide access by the secondary user to a print list including a subset of secure print jobs, the subset including the print job created by the primary user. The processor is further configured to provide the secondary user with an alternate access mechanism for secure print authentication for printing the electronic document as part of the print job created by the primary user based on a relationship between the primary user and the secondary user. The apparatus may include additional electrical elements used in conjunction with general electronics and printing technology as well as specific electrical elements necessary for operation in specific types of wired and/or wireless communication networks. The processor may further be embodied as one or more processors and may include other elements necessary to perform the various operations as described above. The memory may include additional elements including, but not limited to, a data storage element, and a memory for storing program instructions. The memory or similar elements may provide the program instructions to the processor in order to execute the various mechanisms in the embodiments described herein.

The implementation of one or more of the aspects of the processes, mechanisms, systems, and devices of the present embodiment provides the ability to allow an alternate or secondary user to request and receive a release for a print job at a printer that has been enabled as a secure print job for the user, the primary user, that created or requested the print job and is not capable or available to access the printer. If needed, an authentication mechanism to print an electronic document as part of the print job is created and provided to the secondary user. The implementation addresses issues associated with sharing private passcodes or other authentication mechanisms between users while providing additional printing flexibility, particularly for users who work together as a team. The implementation further reduces unnecessary file transfer between users to timely print an electronic document and further permits a back-up user to access business-related documents for a user with a secure business printing account on a multi-function device (MFD) that includes remote print and facsimile collection functions. Finally, the implementation may be used to mitigate delay in printing an electronic document in the event that the primary user either does not have a scancard or has forgotten the password, passcode, or pin associated with the secure access mechanism.

These and additional operations are further described with respect to the embodiments depicted in FIGS. 1-9 below.

FIG. 1 illustrates an exemplary system 100 for releasing a secure print job between users. System 100 includes a plurality of user devices 110a-110c coupled to a plurality of MFDs 130a-130d through a network 120. User devices 110a-110c and MFDs 130a-130d may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110a-110c may additionally be located in a different or remote facility from the dwelling or building where the one or more of the MFDs 130a-130d are located. The one or more remotely located user devices 110a-110c may be communicatively coupled to the one or more MFDs 130a-130d through a private or public network using a communication protocol including, but not limited to, Internet Protocol or any cellular communication protocols.

In operation, system 100 performs various aspects of a mechanism for releasing a secure print job between users. The mechanism may be performed entirely in one or more of MFDs 130-130d. In some instances, some portions of the mechanism may be performed in one or more of user devices 110a-110c. The mechanism includes receiving a print job associated with an electronic document at one of the MFDs 130a-130d. The print job is created by a first or primary user at one of the user devices 110a-110c and sent to the one of the MFDs 130a-130d over network 120. The first or primary user may be the owner or author of the electronic document and may prefer to print the electronic document using a secure print mechanism to prevent other users that are not approved or authorized by the first or primary user from accessing, printing, retrieving, and/or viewing the electronic document as part of the print job. To accommodate the preference of the first or primary user, the print job includes instructions for secure print authentication by a second or secondary user that is authorized or approved by the first or primary user. The mechanism further provides access by the second or secondary user to a print list displayed on the one of the MFDs 130a-130d selected for printing by the first or primary user. The print list includes a subset of secure print jobs including the print job created by the first or primary user. The one of the MFDs 130a-130d further sends a print job release request notification to the primary user over network 120 when the second user selects, using the user interface on the one of the MFDs 130a-130c, the print job created by the primary user. The second or secondary user is further provided an alternate access mechanism for secure print authentication on the display of the one of the MFDs 130a-130d based on a relationship between the first or primary user and the second or secondary user. The alternate access mechanism allows the second or secondary user to print the electronic document as part of the print job created by the first or primary user on the one of the MFDs 130a-130d as part of the print job when the second or secondary user has completed the alternate access mechanism for the secure print authentication.

In some embodiments, the print job instructions further include a secure access mechanism for the primary user that is different from the alternate access mechanism. For example, the secure access mechanism may be a private passcode unique to the primary user or may be a link associated with recognizing some form of a scancard or security card at the one of the MFDs 130a-130d.

In some embodiments, the mechanism may include determining if the secondary user is an authorized user for printing on a printer chosen by the primary user. A user may be authorized as part of an administrative task for network 120 and may include having a valid registered email address or account in the network or may include having specific login information for the one of the MFDs 130a-130d. In some instances, the subset of secured print jobs may include all secure print jobs on the printer when it is determined that the secondary user is an authorized user. Each of the secure print jobs may also be displayed for selection with primary user information. Alternatively, the subset may include only secured print jobs enabled for printing by unauthorized users when it is determined that the secondary user is not an authorized user. In some instances, unauthorized users may not see any specific information associated with the subset of secure print jobs displayed as part of the access to the print list.

In some embodiments, the mechanism may include determining if the secondary user is included on a first list of pre-approved additional users for printing electronic documents as part of print jobs created by the primary user. The print job release request notification may be sent to the primary user if the secondary user is not included in the first list. In some instances, the print job release request notification may include identification information for the secondary user when it is determined that the secondary user is additionally not an authorized user. The secondary user that is not an authorized user may be prompted to enter the identification through a user interface on the one of the MFDs 130a-130c. The identification information for the secondary information may include the name, email address, twitter account handle, or other suitable identification. It is important that in some embodiments, account information or other suitable identification for a secondary user that is an authorized user may be automatically included in the print job release request notification or provided to the primary user in any other subsequent notifications.

In some embodiments, the relationship between the primary user and the secondary user may involve including the secondary user on a second list of pre-approved additional users for printing electronic documents as part of print jobs created by the primary user. The second list may include assistants, colleagues, office neighbors or other people that have an association or connection to the primary user. In some instances, the alternate access mechanism for secure print authentication may be provided to the secondary user when the secondary user is not included in the second list. Alternatively, the print job release may be directly provided to the secondary user without providing any further alternate access mechanism for secure print authentication when the secondary user is included in the second list. In some embodiments, the mechanism may further include providing a print job release to the secondary user without an alternate access mechanism for secure print authentication when the secondary user is included in the second list. Further, in some embodiments, a print job release may also be provided to the secondary user without an alternate access mechanism for secure print authentication when the secondary user is included in the first list.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Details related to devices similar to MFDs 130a-130d will be described in further detail below.

Figure 2:
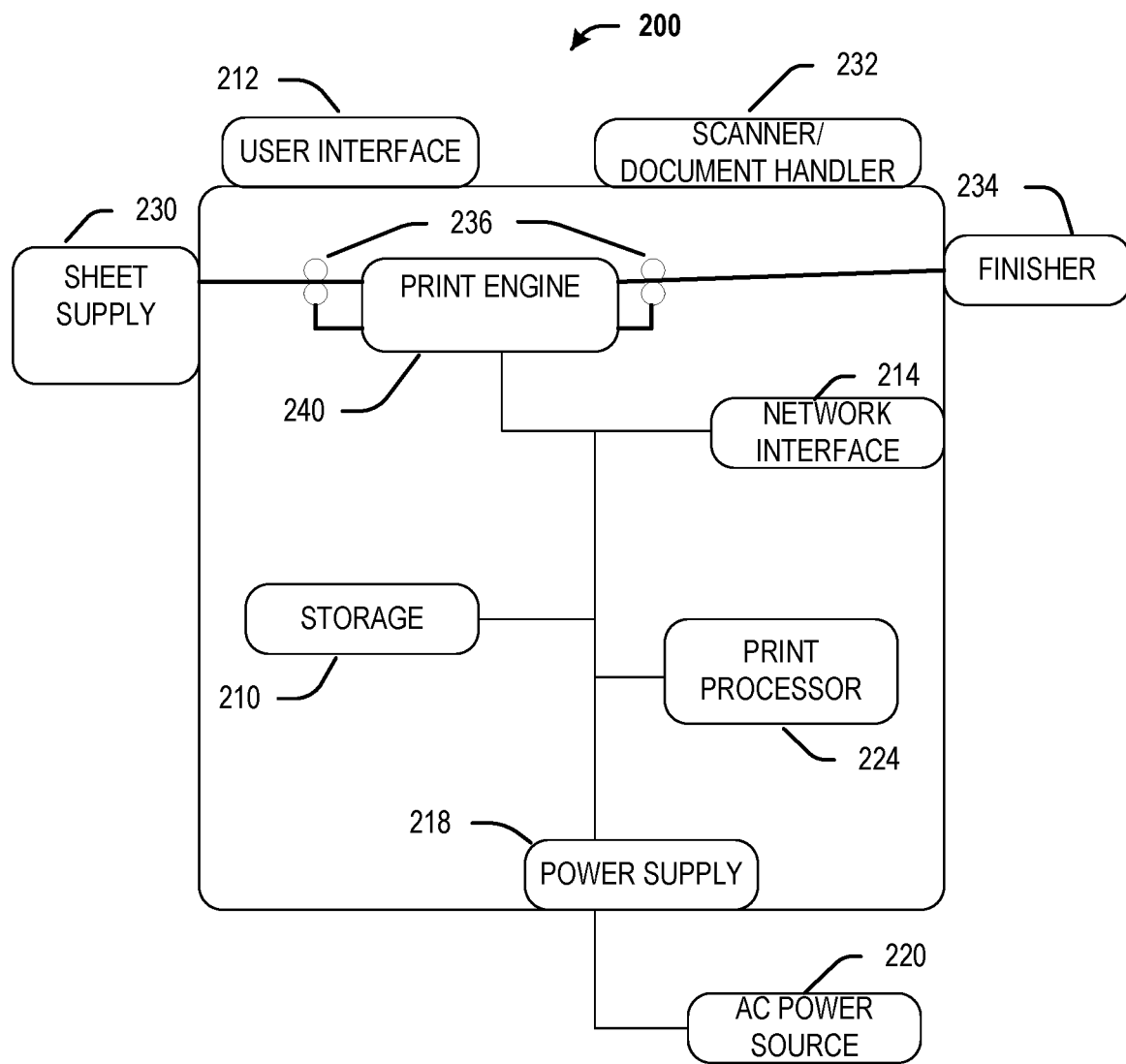
FIG. 2 depicts an exemplary printing device for releasing a secure print job between users.

FIG. 2 illustrates an exemplary printing device 200, which can be used for releasing a secure print job between users. Printing device 200 may operate in a manner similar to MFDs 130a-130d described in FIG. 1. Printing device 200 may also be embodied as, or incorporated in, a printer, copier, multi-function machine, or other device that includes the capability to print an electronic document on a physical printable and/or readable media, such as paper. Printing device 200 includes a marking device or printing engine 240 capable of printing markings on sheets of print media, a print processor 224 operatively coupled to the printing engine 240, a user interface 212 operatively coupled (not shown) to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in printing device 200 including storage 210, network interface 214, print processor 224, and printing engine 240. Other elements may be included in printing device 200 but are not described here in the interest of conciseness.

In operation, a print job associated with an electronic document created or requested by a user is received. The print job and/or electronic document may be received through the network at network interface 212 from a user device (e.g., user devices 110a-110c). The print job and/or electronic document may also be stored and/or retrieved from storage 110. The user creating or requesting the print job may require that the electronic document be printed using a secure print mechanism to prevent other unapproved or unauthorized users from printing, retrieving, and/or viewing the electronic document. However, the user may not be available or able to access printing device 200 authenticate the secure print mechanism for the print job. To address such a situation, the print job includes instructions for secure print authentication by a second user that is authorized or approved to print the electronic document. The print job may additionally include instructions for a separate secure access mechanism, such as entry of a pin code or a passcode on user interface 212, for the user that created or requested the print job to print the electronic document. The separate secure access mechanism may be different from the alternate access mechanism to maintain the privacy of the secure access mechanism associated with the user creating or requesting the print job. The second user, who is available and able to print documents on printer 200, accesses a print list on user interface 212 that includes a listing for the print job created or requested by the user. The print list is generated from information stored in storage 210 for all print jobs provided to printing device 200 from any users and/or locations. The information stored in storage 210 may include print job-related details, such as user/job identification (ID), job details, number of pages, user authentication, job status, etc. The information may be stored in some form of a grid array such as is illustrated in the following table:

| Job ID | Job Type | Owner | Job Status |
| --- | --- | --- | --- |
| 12341 | Fax Print | Arun | Queued |
| 23456 | Email Print | David | Queued |
| 26874 | Secured Print | Ravi | Queued |

After selection of the print job by the second user, print processor 224 generates a release request notification for the print job and provides or sends the notification to the user that created or requested the print job. The notification may be provided over the network (e.g., network 120) through network interface 214 to a user device (e.g. to one of the user devices 110a-110c). The notification may alternatively be provided or sent using a different communication network. For example, the notification may be sent to a phone device of the user as an email or short message service (SMS) message using a cellular network. The email or SMS message may include a hyperlink for user input to accept or reject the print job release request along with other information.

Print processor 224 also provides an alternate access mechanism on user interface 212 for secure print authentication by the second user for printing the electronic document as part of the print job. The alternate access mechanism is provided based on a relationship or association between the user that created or requested the print job and the second user. The alternate access mechanism may include a unique passcode, among other mechanisms, for the second user to enter on user interface 212. The passcode may be provided to the second user at a user device (e.g., user devices 110a-110c) or may be provided to the second user through an alternate communication mechanism, such as via an SMS message or phone call. For example, printing device 200 may generate and send a unique, one time, four-digit passcode or pin to the user that created or requested the print job as part of the print job release request notification. The passcode or pin may be generated in print processor 223 based on the secure print authentication instructions for the second user in the print job. If the user that created or requested the print job acknowledges release of the print job, the passcode or pin may be provided or sent on to the second user (e.g., at printing device 200 or at a user device) through the network (e.g., network 120). Alternatively, the passcode or pin may be sent on via an SMS message, email, or telephonic discussion to a phone device of the second user. Other alternate access mechanisms may also be used for secure print authentication including mechanisms that are known to those skilled in the art. The second user enters the passcode or pin user interface 212 in much the same way as may used to enter a secure access mechanism.

After the necessary actions are taken (e.g., by entry on user interface 212 by the second user) to complete the alternate access mechanism (e.g., enters the provided passcode or pin using user interface 212) for secure print authentication on user interface 212, print processor 224 instructs print engine 240 to print the electronic document based on the print job created or requested by the user. After the electronic document is printed and the print job is considered complete, a notification of completion may be sent (e.g., via network 120 or through an alternate communication channel) to one or both of the second user and the user that created or requested the print job. The notification may also include identification information associated with the second user (e.g., name, user login, email address, or twitter account handle).

Depending on a particular level of permission or authentication granted to the second user, certain additional steps may be taken, or other steps may be bypassed before the second user is permitted to print the electronic document. For example, an initial level of permission or authentication may include whether the second user is an authorized user for printing on printing device 200. An authorized user may have login credentials for printing device 200 or for the network (e.g., network 120) that includes printing device 200. For example, a user profiles management system, included completely or in part in print processor 224, may maintain a complete list of authorized users based on certificate validation in a database. The database may be stored completely or in part in storage 210 and may be periodically updated or renewed through an administrative function. The user profiles management system may be used to validate every user's login information against the database. Once the second user completes successful user certificate validation through user interface 212 and print processor 224, the second user will be authorized to access permitted applications, such as secure printing, in printing device 200.

If the second user is an authorized user for printing on printing device 200, then the subset of secure print jobs displayed in the print list on user interface 212 may include all secure print jobs on the printer. Additionally, the secure print jobs may be displayed with information identifying the user that created of requested the print job and/or the electronic document for each of the secure print jobs. The information may include, but is not limited to, the name of the user, the email address of the user, the name of the print job, and the name of the electronic document. If the second user is not an authorized user, then the subset of secured print jobs may include only those secure print jobs that have been designated to be printed by users who are not authorized for printing on printing device 200. As an important security and privacy element any print jobs that are viewable by the second user that is not authorized for printing on printing device 200 may be displayed in a print job selection menu on user interface 212 without any specific information identifying the user that created or requested the print job and/or the electronic document. Further, for a second user that is not authorized for printing on printing device 200, the second user may be required to enter identification information (e.g., name, user login, email address, or twitter account handle) on user interface 212.

In some embodiments, the user that created or requested the print job may be provided with one or more menu selections during print job creation (e.g., on his/her user devices or on user interface 212) for selecting whether any user that is authorized to print on printer 200 may view and print secure print jobs and further for selecting whether any user that is not authorized may print secure print jobs that are created or requested by the user. It is important to note that a user that is authorized may also be referred to as a secure user or a private user and a user that is not authorized may be referred to as a nonsecure user or public user.

A second level of permission or authentication may be created by the user that created or requested the print job. The user may create a first list of approved users for access to secure print jobs, referred to as an approved list of users. The approved list of users may be specific to printing device 200 or may be approved for the entire network of printers. The approved list of users may be useful for granting access to secure print jobs for a group of users. The approved list of users may reside on printing device 200 (e.g., as part of a user profile stored in storage 210) or may reside on a user device where the user created or requested the print job and sent as instructions with the print job. In some embodiments, when the second user selects a print job from the print list displayed on user interface 212, print processor 224 compares identification information for the second user with the user information from the approved list of users. If print processor 224 determines that the second user is included in the approved list of users, the second user may directly select a job release entry for the print job on user interface 212 without additional entry associated with the alternate access mechanism. Additionally, the print job release request notification may not be sent to the user that created or requested the print job. It is important to note that the use of the approved list of users may be enabled and disabled at the time the print job is created or requested by the user or at any other time, as may be necessary or desired.

A third level of permission or authentication may be created by the user that created or requested the print job. The third level may depend on some form of a relationship, connection, or association between the user that created or requested the print job and the second user. The user may create a second list of users approved for access to secure print jobs under certain circumstances, referred to as a declared list of users. The declared list of users may be specific to printing device 200 or may be approved for the entire network of printers. The declared list of users may be useful for granting access to secure print jobs for a more casual user or for a user that is not an authorized user, requiring additional acknowledgement or confirmation from the user that created or requested the print job.

The declared list of users may reside on a user device where the user created or requested the print job or on a different device of the user. In some instances, the declared list of users may reside on printing device 200 or on the network (e.g., network 120). In some embodiments, when the second user selects a print job from the print list displayed on user interface and proceeds to request a print job release request notification for the selected print job, the user identification information for the second user is compared with the user information from the declared list of users. If the second user is found to be included in the declared list of users, the second user may directly receive a job release for the print job without additional entry for the alternate access mechanism.

If the second user is not included in the second, or declared users list, then a print job release notification may be provided as described above. In some cases, the second user may be included in the second, or declared, users list but not in the first, or approved users list. In these cases, a job release notification may be sent to the user who created or requested the print job, to allow for confirmation or acknowledgment. The comparison with respect to the second, or declared, users list may be performed after the job release notification is sent and may include identification information for the second user (e.g., name, user login, email address, or twitter account handle). If the second user is not included in the first, or approved users list, or the second, or declared, users list, the second user will require further input as part of the alternate access mechanism for secure print authentication as described above.

Print processor 224 may also be referred to as an image processor and operates in a different manner than a general purpose processor because it is specialized for processing image data. Further, print processor 224 along with storage 210 may also be referred to as a copy control system (CCS). A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning printable media for entry onto media path 236. Sheet supply 230 may include a bypass tray that allows external print media, such as previously printed pages to be added and entered into media path 236 for marking instead of, or in addition to, any printable media already in sheet supply 230. It is important to note that printing engine 240 along with sheet supply 230, scanner document handler 232, finisher 234 and media path 236 may collectively be referred to as an image output terminal (IOT).

As part of the printing function in printing device 200, user interface 212 displays one or more menus that may include various print options for the print jobs to be printed. In some instances, user interface 212 may be referred to as a local user interface or LUI. User interface 212 may receive instructions for displaying the menus from print processor 224 and may further provide user entry information to print processor 224. The menus may include options for a user that created or requested the print job. The menus may include additional options for access to printing secure print jobs by second users when the user that created or requested the print job does not have access to printing device 200 or is otherwise unavailable to the print the secure print job. In addition, user interface 212 may display one or more screens related to releasing secure print jobs to a second user. Some of the various menus and screens related to accessing secure print jobs will be described in further detail below.

Printing device 200 may also be constructed and implemented as a set of modules that may be interchangeable between a plurality of printers. In some embodiments, printing device 200 may be constructed using an IOT coupled to a CCS, as described above, and further including an LUI, a power supply, and a network interface. Any one of these of the modules may be interchangeable with any like modules from other models, providing some level of flexibility and efficiency between products. As a result, one or more aspects of the present embodiments may be implemented as part of the CCS in printing device. In some embodiments, the CCS includes a memory for storing information for a print job created by a user. The print job is associated with an electronic document and includes instructions for secure print authentication by a second user. The CCS further includes a processor that is configured to, among other things, provide access by the second user to a print list comprising a subset of secure print jobs, including the print job created by the user. The processor is further configured to provide the second user with an alternate access mechanism for secure print authentication for printing the electronic document as part of the print job created by the user based on a relationship between the user that created the print job and the second user. The processor may also be configured to generate instructions for printing the electronic document, using the IOT, as part of the print job created by the user when the second user has completed the alternate access mechanism for the secure print authentication.

Figure 3:
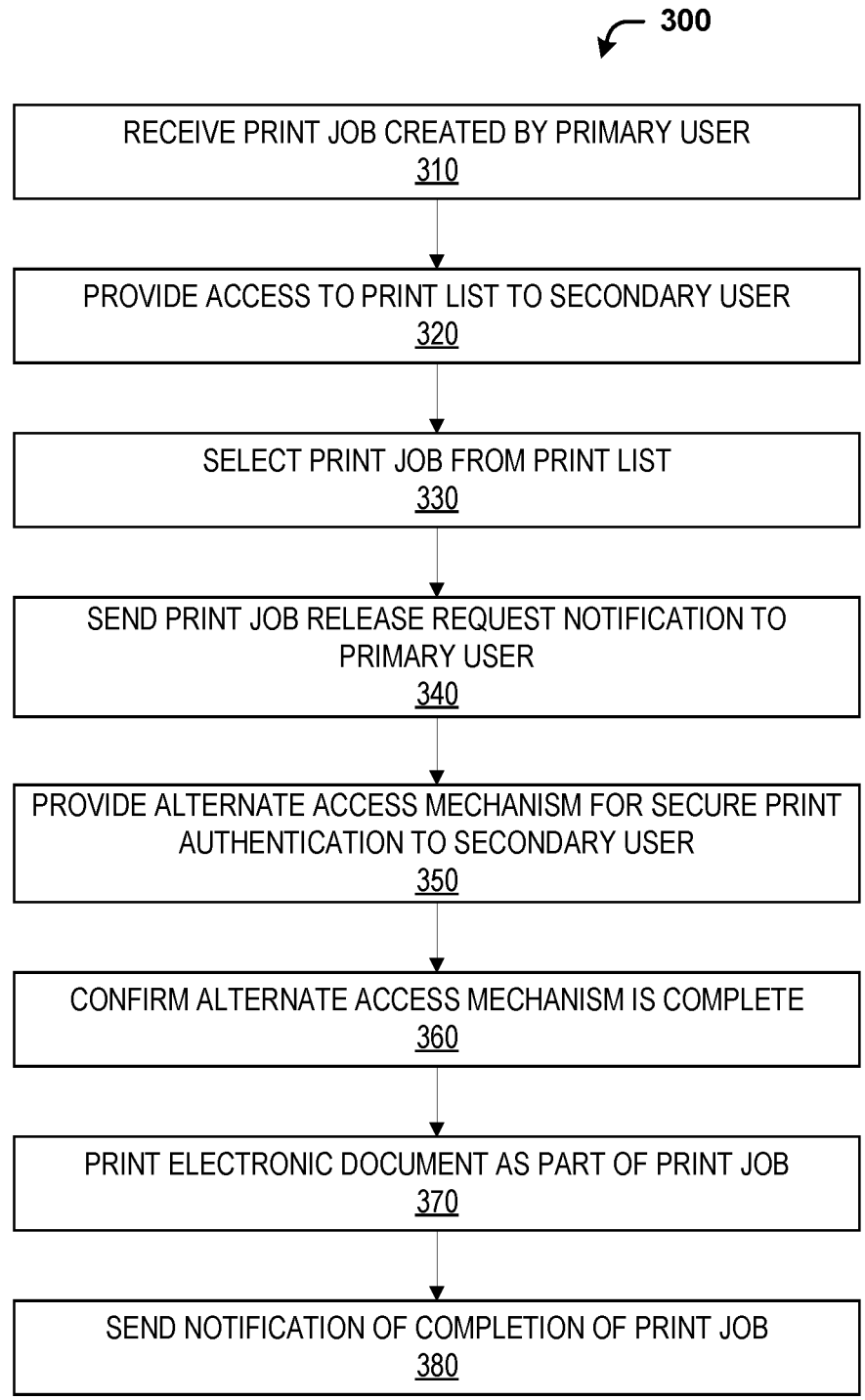
FIG. 3 depicts an exemplary process for releasing a secure print job between users.

FIG. 3 illustrates an exemplary process 300 for releasing a secure print job between users. Process 300 is primarily described with respect to a printing device, such as printing device 200 described in FIG. 2. Process 300 may also be performed by a printer in combination with other functions, such as MFDs 130a-130d described in FIG. 1. Further, process 300 may be performed in a combination of devices, such as user devices 110a-110c and MFDs 130a-130d described in FIG. 1. Although process 300 depicts steps performed in a particular order for purposes of illustration and discussion, the operations discussed herein are not limited to any particular order or arrangement. One skilled in the art, using the disclosures provided herein, will also appreciate that one or more of the steps of process 300 may be omitted, rearranged, combined, and/or adapted in various ways.

At step 310, a print job associated with an electronic document created by a primary user, is received at printing device 200. The print job, along with the electronic document, may be provided from a print server or printer queue internal to printing device or external to printing device 200 through network interface 214. The print job may be further processed in print processor 224 and stored in storage 210. The print job includes instructions for secure print authentication by a secondary user as well as other instructions and information as has been described above. For example, the instructions may include a private personal passcode that is unique to the primary user and that is not the same as the alternate access mechanism for the secondary user.

At step 320, access to a print list is provided to the secondary user through a display on user interface 212. The print list includes a subset of secure print jobs including the print job created by the primary user. The print list may include and display various data about each of the secure print job, the data displayed may depending on certain status or permission conditions for the secondary user. In some embodiments, if the secondary user is an authorized user as described above, the print list may include all the secure print jobs in printing device 200. Each of these secure print jobs may be displayed with information for the primary use, and/or electronic document. In some embodiments, if the secondary user is not an authorized user, the print list may include only those print jobs that have been enabled, by the primary users of the print jobs, for printing by unauthorized users. Each of these secure print jobs may be displayed without any information regarding the primary user and/or electronic document. The determination of whether the user is an authorized user may be carried out in a manner similar to those described above.

At step 330, the secondary user selects a secure print job, on user interface 212, from the displayed print list. After the secondary user selects the secure print job at step 330, then, at step 340, a print job release request notification is created in print processor 224 and sent to the primary user. The notification may be sent to a user device for the primary user (e.g. at one of user devices 110a-110c) over the network (e.g., network 120) using network interface 214. The notification may alternatively be provided to the primary user using a different communication network such as one of the networks described above.

At step 350, an alternate access mechanism for secure print authentication is provided to the secondary user for printing the electronic document as part of the print job created by the primary user. The alternate access mechanism is provided based on a relationship or association between the primary user and the secondary user. In some embodiments, the alternate access mechanism may include, among other things, entering a one time use passcode generated in printing device 200 as part of the notification, and subsequent acceptance by the primary user, of the job release request. Other alternate access mechanisms may also be used. In some embodiments, the relationship or association between the primary user and the secondary may include whether the primary user included the secondary user on an access approval list created by the primary user, such as one or more of the approval lists described above.

At step 360, completion of the alternate access mechanism for secure print authentication by the secondary user (e.g., entry of the passcode or pin using user interface 212) is confirmed by print processor 224. At step 370, after completion of secure print authentication is confirmed at step 360, print processor 224 provides instructions to print engine 236 for printing the electronic document as part of the print job. At step 380, after the electronic document is printed and the print job is complete, a notification of print job completion is sent to the primary user, the secondary user, or both. The print job completion notification may be sent through network interface 214 to the user devices for the primary user and/or secondary user via a local network (e.g., network 120) or through an alternate communication network as has been described earlier.

It is important to note that not all the steps of process 300 may be required for each secondary user requesting access to and printing an electronic document as part of a secure print job created by a primary user. For example, the alternate access mechanism described at step 350 may be automatically or directly provided or completed by the primary user to printing device 200 either as part of the job release request notification sent, at step 340, or as part of previous of the relationship between the primary user and secondary, as described above. Details related to various aspects of alternate access mechanisms for the secondary user as part of secure print authentication will be further described below.

Figure 4:
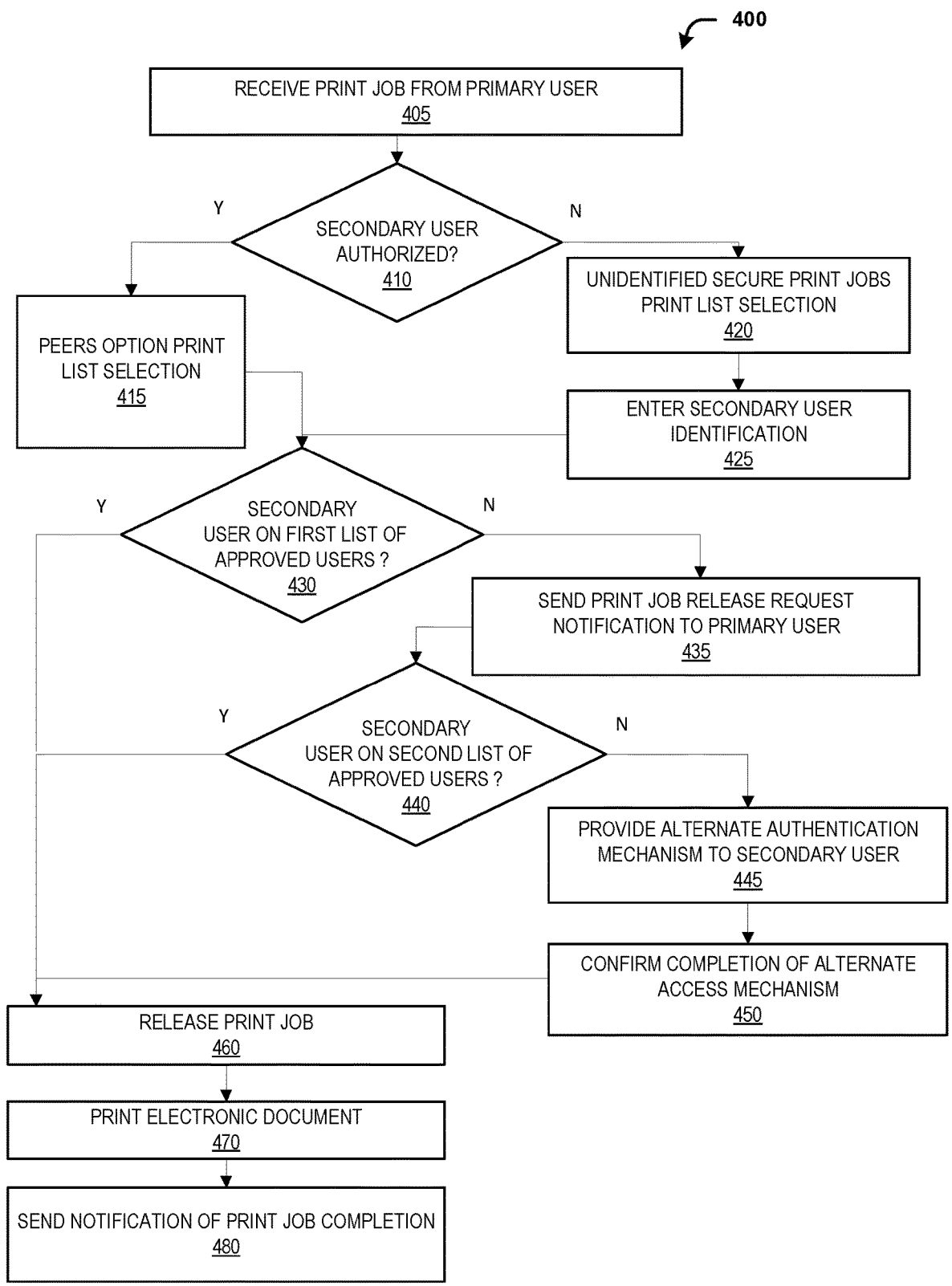
FIG. 4 depicts another exemplary process for releasing a secure print job between users.

FIG. 4 depicts another exemplary process 400 for releasing a secure print job between users. Process 400 is primarily described with respect to a printing device, such as printing device 200 described in FIG. 2. Process 400 may also be performed by a printer in combination with other functions, such as MFDs 130a-130d described in FIG. 1. Process 400 may further expand on or incorporate one or more of the steps described in process 300. Further, process 400 may be performed in a combination of devices, such as user devices 110a-110c and MFDs 130a-130d described in FIG. 1. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 405, a print job associated with an electronic document created by a primary user is received at printing device 200. The print job along with the electronic document may be received from a user device for the primary user (e.g., one of the user devices 110a-110c). The print job and/or the electronic document may also be identified in, and retrieved from, a print server device located remotely from the printing device. The print job includes instructions for secure print authentication by a secondary user as well as other instructions and information as has been described above.

At step 410, a determination is made as to whether the secondary user is an authorized user of printing device 200. An authorized user may have login credentials for printing device 200 or for the network (e.g., network 120) that includes printing device 200. The determination may be made as part of processing by print processor 224 based on administrative data for authorized users stored in storage 210 or in a remote storage device on the network.

If it is determined, at step 410, that the secondary user is an authorized user for printer 200 then at step 415, then a print option is displayed on user interface 212 that includes a peers option print list for selecting a print job. The peers option print list displays all secured print jobs that have been enabled for printing by authorized users on printer 200. Additionally, each of the secure print jobs may be displayed with information identifying the primary user and/or the electronic document.

If it is determined, at step 410, that the secondary user is not an authorized user, then, at step 420, then the peers option print list is not displayed as a print option. User interface 212 instead displays an unidentified secured print jobs print list that includes only secure print jobs that have been designated to be printed by users who are not authorized for printing on printing device 200. Additionally, each of the print jobs in the unidentified secure print jobs print list may be displayed without any information identifying the primary user and/or the electronic document. At step 425, a secondary user that is not an authorized user of printer 200 enters identification information (e.g., name, user login, email address, or twitter account handle) on user interface 212.

At step 430, a determination is made as to whether the secondary user is on a first list of users approved for printing an electronic document as part of a secure print job created by the primary user. The first list of approved users, or approved users list, may be specific to printing device 200 or may be approved for the entire network or printers. In some embodiments, print processor 224, at step 430, compares identification information for the second user with the user information from the approved users list after the secondary user selects a secure print job from the print list, at step 415 or step 420. If it is determined, at step 430, the second user is found to be included in the approved users list, then, at step 460, the print job is released for printing by the secondary user in manner as described above. Additionally, in some instances, a print job release request notification is not sent to the primary user.

If it is determined, at step 430, the user is not included in the approved users list, then a print job release request notification is created in print processor 224 and sent to the primary user, at step 435. The notification may be provided over the network (e.g., network 120) through network interface 214 to a user device for the primary user (e.g. at one of user devices 110a-110c). The notification may alternatively be provided to the primary user using a different communication network such as has been described above. In some instances, such as when the secondary user is not authorized user for printing on printer 200, the notification includes identification information previously entered by the secondary user, at step 425

At step 440, a determination is made as to whether the secondary user is included in a second list of approved users. The second list of approved users, or declared users list, is created by the primary user for users, including the secondary user that have a relationship, association, or connection with the primary user as described above. The declared users list may be specific to printing device 200 or may be approved for the entire network or printers. The declared list of users may reside on a user device of the primary user and may be accessed as part of receiving the print job release request notification, at step 435. In some embodiments, the identification information for the secondary user in the notification may be compared, at step 440, with the user information in the declared users list on the user device of the primary user. If it is determined, at step 440, that the secondary user is included in the declared users list, the primary user may send a confirmation to release the print job, at step 460, to printing device 200 without any additional entry necessary for the alternate access mechanism.

If it is determined, at step 440, that the secondary user is not on the declared users list, then at step 445, an alternate access mechanism for secure print authentication is provided to the secondary user for printing the electronic document as part of the print job created by the primary user. In some embodiments, the alternate access mechanism may include, among other things, entering a one time use passcode generated in printing device 200 as part of the notification and acceptance of the job release request by the primary user. Other alternate access mechanisms may also be used. It is important to note that in some embodiments, a secondary user may be able to bypass either one or both of sending of the print job release request notification to the primary user and entering additional information as part of the alternate access mechanism to print the electronic document if the secondary user is included in one or both of the approved users list or the declared users list.

At step 450, the entry and completion of alternate authentication mechanism is confirmed. At step 460, the secure print job is released to the secondary user after completion of the alternate access mechanism for secure print authentication by the secondary user is confirmed, at step 450, by print processor 224. At step 370, print processor 224 provides instructions to print engine 236 to print the electronic document as part of the print job. At step 380, after the electronic document is printed, at step 370, and the print job is complete, a notification of print job completion is sent to the primary user, the secondary user, or both. The print job completion notification may be sent through network interface 214 to the user devices for the primary user and/or secondary user via a local network (e.g., network 120) or through an alternate communication channel as has been described earlier.

The following description for FIGS. 5-9 involve one or more exemplary screenshots from a display in a user interface used for releasing a secure print job between users. The display may be included in one or more user interfaces, such as user interface 212 described in FIG. 2. Further, the exemplary screenshots in FIGS. 5-9 will be described in relation to one or more of the steps of process 400 described in FIG. 4. It is important to note that the exemplary screenshots in FIGS. 5-9 may also be used in conjunction with process 300 in FIG. 3 as well as other processes similar to, and/or containing aspects of, process 400 or process 300 in conjunction with releasing a secure print job between users.

Figure 5:
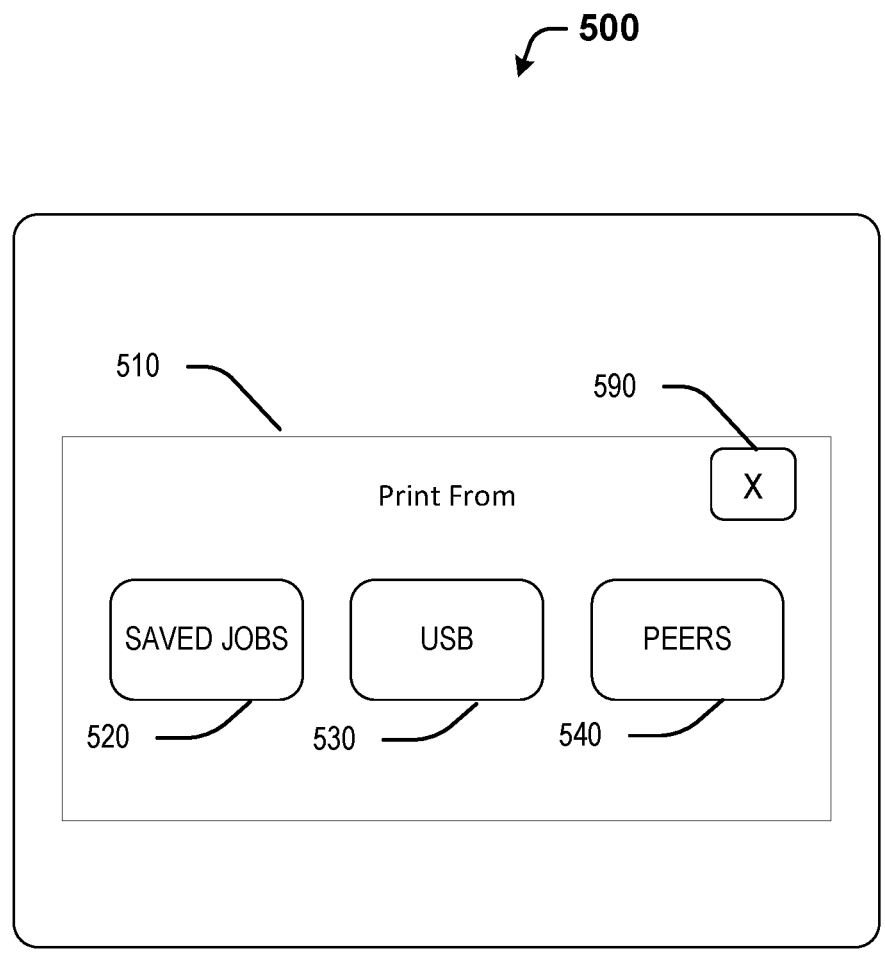
FIG. 5 depicts an exemplary screenshot from a display on a device used as part of releasing a secure print job between users.

FIG. 5 depicts an initial print selection screen 500. Selection screen 500 includes a print from window 510. The print queue or print server associated with the print from window 510 may reside in a printing device, such as printing device 200, or may reside in another device, such as one of the user devices 110a-110c, operatively coupled to the printing device. The print window includes three selection buttons. Selection button 520 is labelled saved jobs and permits access to the saved jobs for the user authorized to print electronic documents on the printer (e.g., a secure user or a private user). Selection button 530 is labelled USB and permits any user to access the printer and print an electronic document that is stored on a local memory coupled to the print through a universal serial bus (USB) communication port on the printer. Selection button 540 is labelled peers and permits a user, such as a secondary user accessing print jobs for a primary user that is otherwise not available to print the electronic document at the printer, to access print jobs for another user (e.g., the primary user). It is important to note that the peers selection button may only be present in print window 510 for users who have been authenticated for printing using the printer as part of the network. A cancel button 590, labelled with an X, is also included to allow for exit of this selection screen and/or return to a previous menu screen on the display.

Figure 6:
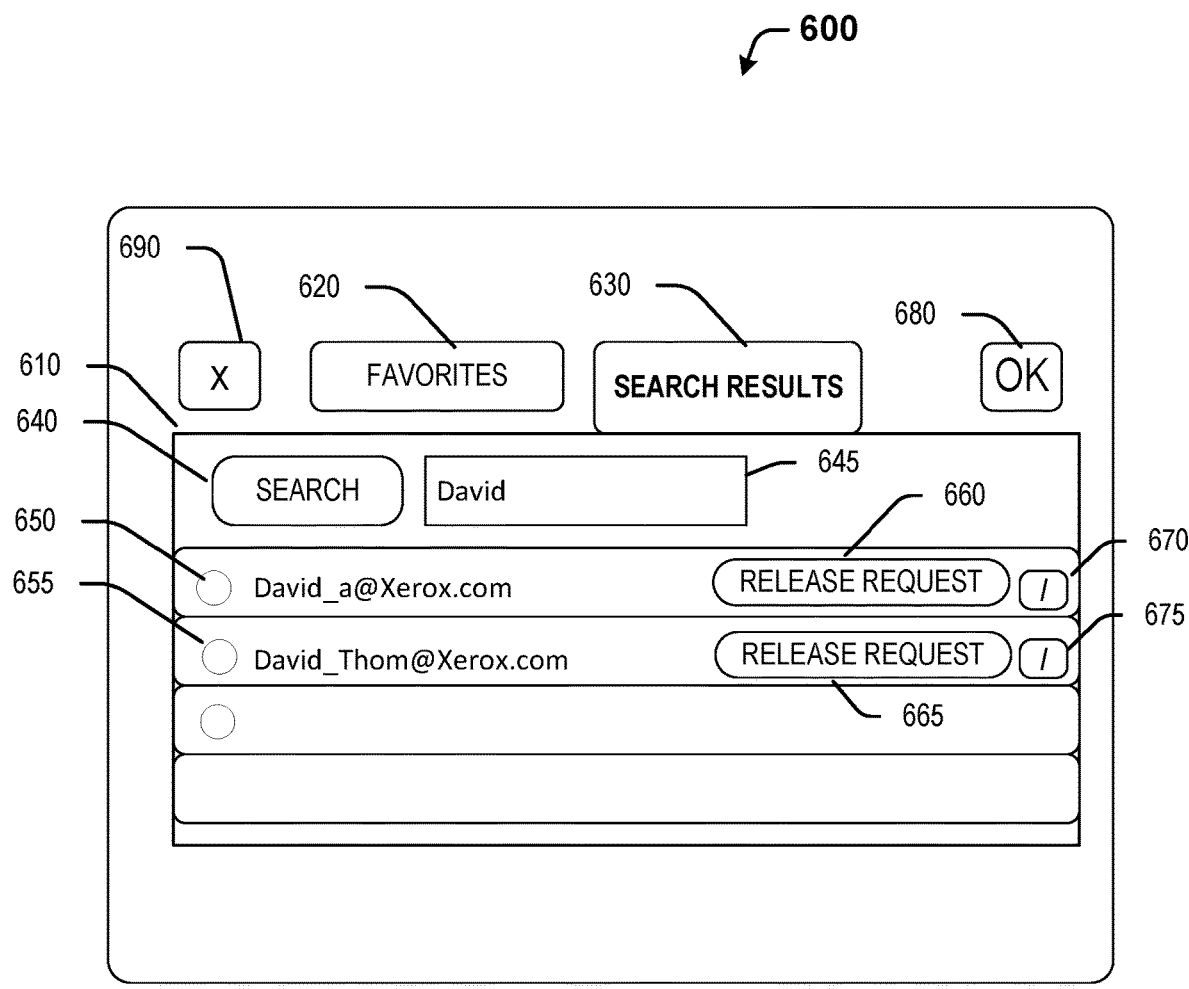
FIG. 6 depicts another exemplary screenshot from a display on a device used as part of releasing a secure print job between users.

FIG. 6 depicts a print job selection screen 600 for the print job and associated electronic document as a result of selecting the peers selection button 540 in initial print selection screen 500. Print job selection screen 600 includes a two selection mechanism tabs, a favorites tab 620 and a search results tab 630. As shown in print job selection screen 600, the search result tab 630 is selected and displays a search results window 610 associated with the search result tab 630. Search results window 610 includes a search text entry box 645 and a search button 640, to enter information for search and initiate the search. The search mechanism provides search results for a list of users currently having pending print jobs on the printer. In a similar manner, the favorites tab 620, when selected, may display a list of users associated in the same manner with the user currently accessing print job (e.g., secondary user). It is important to note that more or fewer selection mechanism tabs may be included in print job selection screen 600, including additional selection mechanisms known to those skilled in the art.

The search results from a search initiated by selecting the search button 640 are displayed in rows. Each row includes a radial selection button 650, 655 as well as information identifying the users found as a result of the search. In search results window 600, an email address for each user is shown but in other embodiments, other information for each user may be shown. Each row also includes a release request button 660, 665 allowing the user accessing the print to request release of the print job for that user in manner similar to that described in step 435 in FIG. 4. Each row further includes an I selection button 670, 675. Selecting I selection button 670, 675 opens an additional window (not shown) that provides additional information about the user identified from the search results and/or additional information about the print job or electronic document. After the user accessing printer selects one or more of the radial selection buttons 650, 655, the user completes the entry by selecting the Ok button 680. A cancel (X) button 690 is also included to allow for exit from the print job selection screen 600 and/or return to a previous menu screen on the display. In some embodiments, selecting the OK button 680 or the cancel button 690 brings up initial print selection screen 500 on the display.

Figure 7:
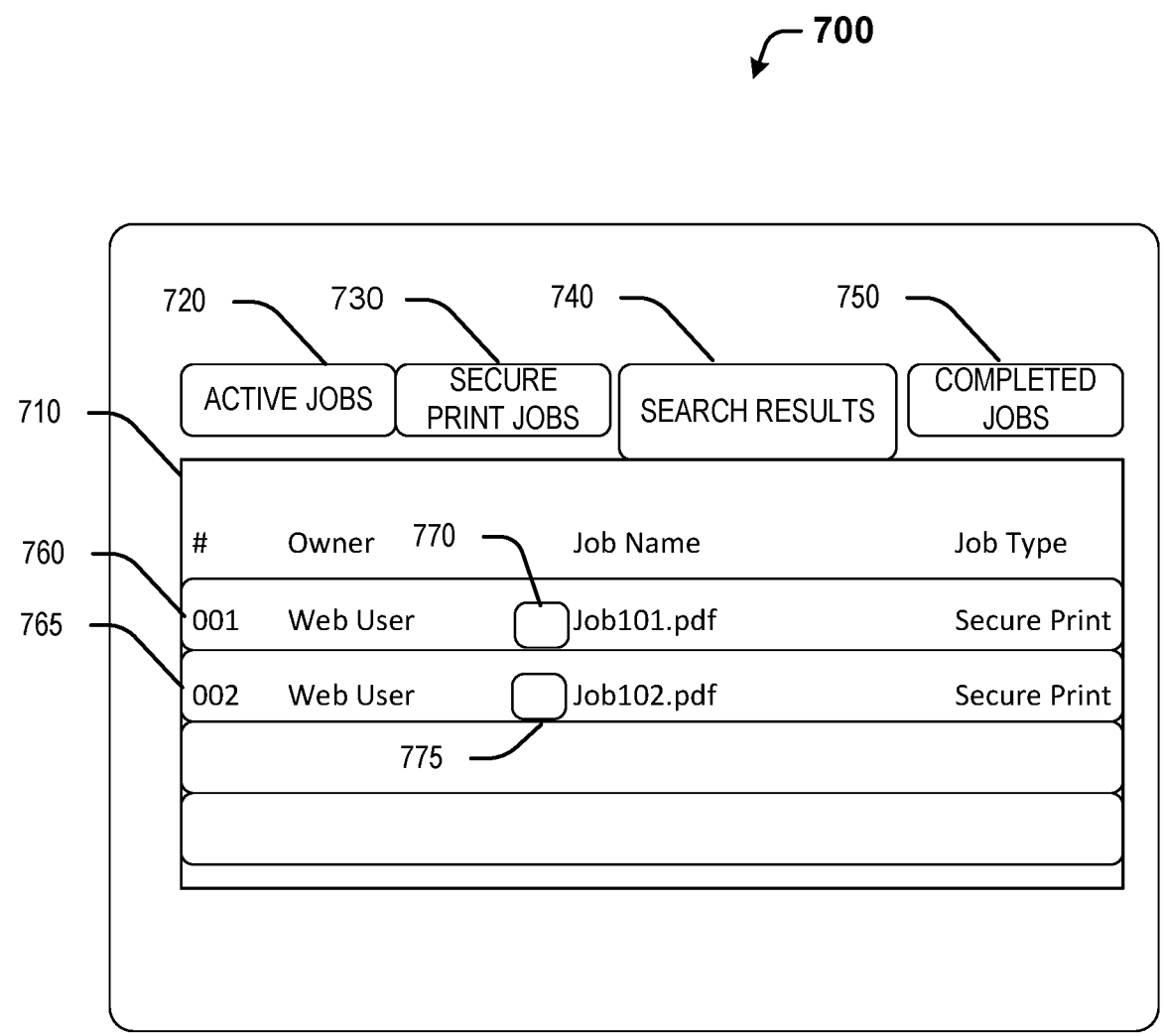
FIG. 7 depicts a further exemplary screenshot from a display on a device used as part of releasing a secure print job between users.

FIG. 7 depicts a different print job selection screen 700 for the print job and associated electronic document as a result of selecting the saved jobs selection button 520 in initial print selection screen 500. The saved jobs selection button 520 may be selected by a user (e.g., a secondary user) accessing a secure print job for another user that does not currently have access to the printer (e.g., a primary user) when the user (e.g., secondary user) is not authorized to print on the printer (e.g., a nonsecure user or a public user). It is important to note that the saved jobs selection button 520 may also be selected by an authorized user that is choosing to print an electronic document for a print job, including a secure print job, owned, created, or requested by himself or herself. The selection tabs shown in print job selection screen may be different for a user depending on whether the user is authorized or not.

Print job selection screen 700 includes four selection mechanism tabs, an active jobs tab 720, a secure print jobs tab 730, an unidentified secure jobs tabs 740, and a completed jobs tab 750. As shown in print job selection screen 700, the unidentified secure jobs tab 740 is selected and displays a search results window 710 associated with the unidentified secure jobs tab 740. The unidentified secure jobs tab is typically included and displayed as part of print job selection screen 700 for uses who are not authorized to print on the printer. It is important to note that more or fewer selection mechanism tabs may be included in print job selection screen 700, including additional selection mechanisms known to those skilled in the art.

Search results window 710 includes a set of rows 760, 765 associated with currently pending secure print jobs. Each of the rows 760, 765 includes only generic information for each secure print job, including a print job number, an owner (generally not showing any specific information), a job name that may be assigned by the printer, and a job type (e.g., secure print). It is important to note that each of the rows 760, 765 do not provide any identification information specific to the user (e.g., the primary user) who owns, created, or requested, the secure print job and further does not include information specific to the electronic document to be printed as part of the secure print job. By not providing any specific information about the user (e.g., primary user) or the secure print job, an unauthorized user (e.g., a nonsecure user or a public user) for the printer may access and print a secure print job while still maintain a high level or protection, privacy, and/or security with respect to the user (e.g., primary user) and the secure print job.

Figure 8:
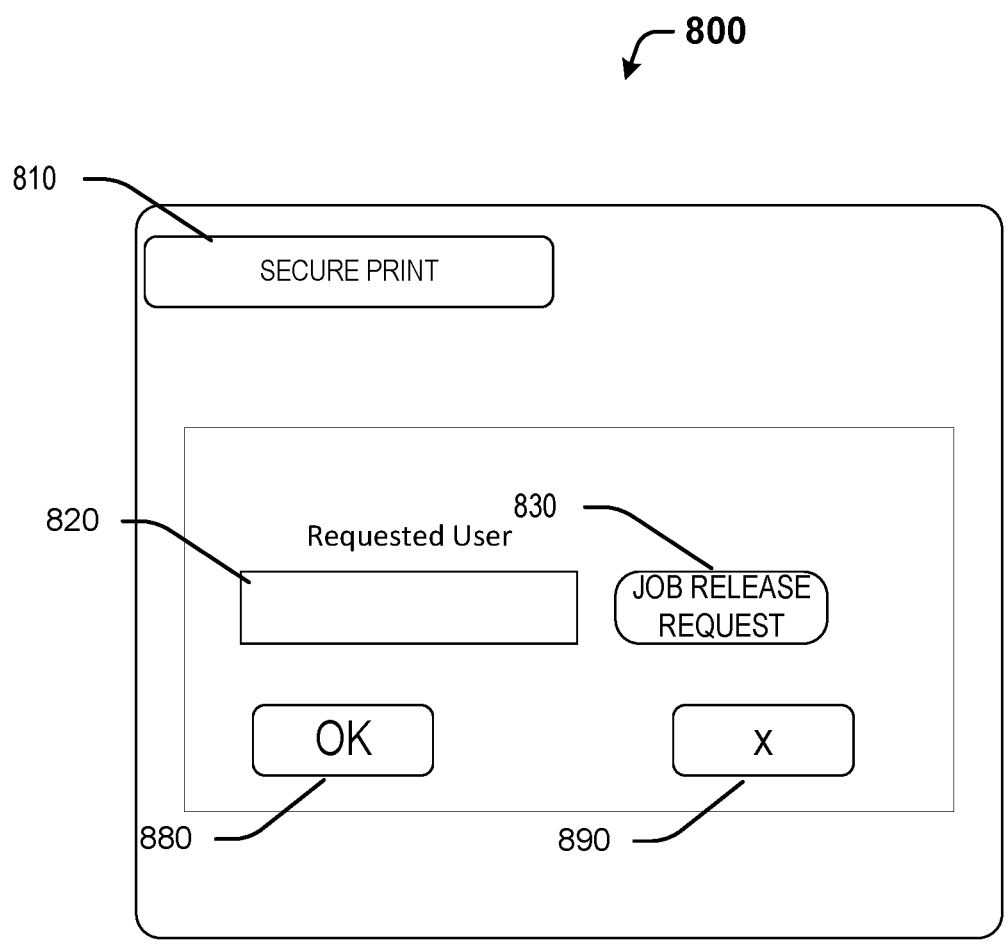
FIG. 8 depicts yet another exemplary screenshot from a display on a device used as part of releasing a secure print job between users.

Each of the rows 760, 765 also include a secure print release button 770, 775 labelled with an unlock symbol. Once the user (e.g., unauthorized, nonsecure, or public user) that has access to the printer identifies the secure print job for which to request access from rows 760, 765, the user selects the associated secure print release button 770, 775. FIG. 8 depicts a secure print screen 800 for the secure print job selected in print job selection screen 700. Secure print screen 800 may be used by users that are not authorized (e.g., nonsecure or public users) and are also not on an approved list of secondary users (e.g., an approved user) requesting access to a secure print job owned, created, or requested by a user (e.g., a primary user) who does not currently have access to the printer. Screen 800 includes a secure print identifier 810. Secure print screen 800 also includes an entry box 820 for entering identification information for the user requesting access and release of the secure print and job release request button 830. The user requesting access enters identification information, such as a name or an email address, and selects the job release button 830 in a manner consistent with steps 425, 430, and 435 in FIG. 4. It is important to note that in cases where the user, after entering the identification information in box 820, is identified as included in a first list of approved users (e.g., the approved users list), then button 830 may change state and function as a job release button in a manner as described at step 435 described above. After the user accessing the printer enters the identification information and selects job release button 830, the user completes the entry by selecting the Ok button 880 and waits, if necessary, for additional inputs from the user that owns, created, or requested the secure print job. A cancel (X) button 890 is also included to allow for exit from the print job selection screen 800 and/or return to a previous menu screen on the display. In some embodiments, selecting the OK button 880 bring up initial selection screen 500 and selecting cancel button 890 brings up print job selection screen 700 on the display.

Figure 9:
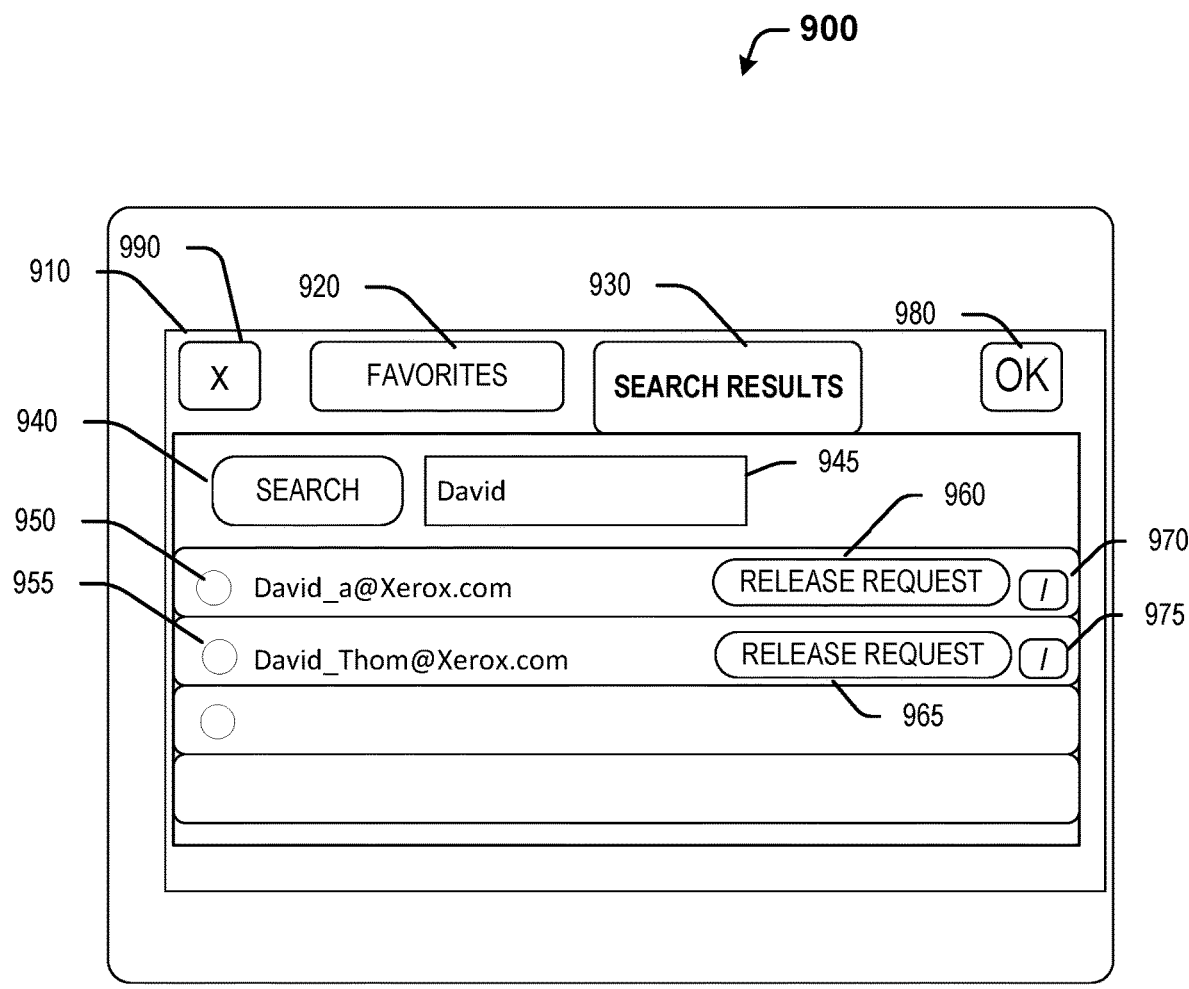
FIG. 9 depicts still a further exemplary screenshot from a display on a device used as part of releasing a secure print job between users.

FIG. 9 depicts a further print job selection screen 900 for the print job and associated electronic document as a result of selecting the peers selection button 540 in initial print selection screen 500. Print job selection screen 900 includes selection mechanism tabs 920, 930, search button 940, search text entry box 945, Ok button 980 and Cancel button 990 that operating in a manner similar to elements 620, 630, 640, 645, 680, and 690 described in FIG. 6 and will not be further described here.

The search results from a search initiated by selecting the search button 940 are displayed in search window 910. Each row includes a radial selection button 950, 955 as well as information identifying the users found as a result of the search in a manner similar to selection buttons in 650, 655 in the rows in search window 610 in FIG. 6. Each row in search window 910 also includes a job release button 960, 965 allowing the user (e.g., secondary user) accessing the printer to directly release the secure print job for the user that owns, created, or requested the secure print job in a manner similar to that described in step 430, 440, and 460 in FIG. 4. The job release buttons 960, 965 will appear in one or more rows in search window 910 for any entries for which the user accessing the printer is included on one or more approved lists of users as described in either step 430 (e.g., approved user list) or step 440 (e.g., declared user lists). Each row further includes an I selection button 970, 975 that operates in a manner similar to the I selection buttons 670, 675 in FIG. 6.

The terms printer, MFD, or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for releasing a secure print job between users (which are intended to be illustrative and not limiting), it is noted that modifications and variations can be made by persons skilled in the art in light of the above teachings. It is, therefore, to be understood that changes may be made in the particular embodiments of the disclosure disclosed which are within the scope of the disclosure as outlined by the appended claims.

What is claimed is:

1. A method comprising:
receiving a print job associated with an electronic document created by a primary user, the print job comprising instructions for secure print authentication by a secondary user;
providing access by the secondary user to a print list comprising a subset of secure print jobs, the subset comprising the print job created by the primary user;
sending a print job release request notification to the primary user when the secondary user selects the print job created by the primary user;
providing the secondary user with an alternate access mechanism for the secure print authentication in response to the print job request notification sent to the primary user, the alternate access mechanism for printing the electronic document as part of the print job created by the primary user based on a relationship between the primary user and the secondary user; and
providing instructions to print the electronic document as part of the print job when the secondary user has completed the alternate access mechanism for the secure print authentication.

2. The method of claim 1, wherein the print job further comprises instructions for a secure access mechanism by the primary user that is different from the alternate access mechanism.

3. The method of claim 2, wherein the secure access mechanism is a private passcode unique to the primary user.

4. The method of claim 1, further comprising determining whether the secondary user is an authorized user for printing on a printer chosen by the primary user and wherein the subset of secured print jobs comprises all secure print jobs on the printer when it is determined that the secondary user is an authorized user, the secure print jobs displayed for selection with primary user information for each of the secure print jobs.

5. The method of claim 4, wherein the subset comprises secured print jobs enabled for printing by unauthorized users when it is determined that the secondary user is not an authorized user, the secured print jobs displayed for selection with no information associated with the primary user.

6. The method of claim 4, further comprising determining whether the secondary user is included in a first list of pre-approved additional users for printing electronic documents as part of print jobs created by the primary user, and wherein the print job release request notification is sent to the primary user when it is determined that the secondary user is not included in the first list.

7. The method of claim 6, wherein the print job release request notification further comprises identification information for the secondary user when it is determined that the secondary user is not an authorized user.

8. The method of claim 1, wherein the relationship between the primary user and the secondary user comprises inclusion of the secondary user on a second list of pre-approved additional users for printing print jobs created by the primary user and wherein the alternate access mechanism for secure print authentication is provided to the secondary user when the secondary user is not included in the second list.

9. The method of claim 8, further comprising providing a print job release to the secondary user without an alternate access mechanism for secure print authentication when the secondary user is included in the second list.

10. A printing apparatus comprising:
a network interface that receives a print job associated with an electronic document created by a primary user, the print job comprising instructions for secure print authentication by a secondary user;
a user interface that provides access by the secondary user to a print list comprising a subset of secure print jobs, the subset comprising the print job created by the primary user;
a print processor that generates a print job release request notification to send to the primary user through the network interface when the secondary user selects the print job created by the primary user, the print processor further providing an alternate access mechanism for secure print authentication by the secondary user for printing the electronic document as part of the print job created by the primary user based on an association between the primary user and the secondary user; and
a printing engine that prints the electronic document as part of the print job created by the primary user when the secondary user has completed the alternate access mechanism for secure print authentication.

11. The printing apparatus of claim 10, wherein the print processor further determines whether the secondary user is an authorized user for printing on a printer chosen by the primary user and wherein the subset of secured print jobs comprises all secure print jobs on the printer when it is determined that the secondary user is an authorized user, the secure print jobs displayed for selection with primary user information for each of the secure print jobs.

12. The printing apparatus of claim 11, wherein the subset comprises secured print jobs enabled for printing by unauthorized users when it is determined that the secondary user is not an authorized user, the secured print jobs displayed for selection with no information associated with the primary user.

13. The printing apparatus of claim 11, wherein the print processor further determines whether the secondary user is included in a first list of pre-approved additional users for printing electronic documents as part of print jobs created by the primary user, and wherein the print job release request notification is sent to the primary user when it is determined that the secondary user is not included in the first list.

14. The printing apparatus of claim 10, wherein the association between the primary user and the secondary user comprises inclusion of the secondary user on a second list of pre-approved additional users for printing print jobs created by the primary user and wherein the alternate access mechanism for secure print authentication is provided to the secondary user when the secondary user is not included in the second list.

15. The printing apparatus of claim 10, wherein the print job further comprises instructions for a secure access mechanism by the primary user that is different from the alternate access mechanism.

16. An apparatus comprising:
a memory for storing information for a print job created by a primary user and an associated electronic document, the print job comprising instructions for secure print authentication by a secondary user; and
a processor configured to:
provide access by the secondary user to a print list comprising a subset of secure print jobs, the subset comprising the print job created by the primary user; and
provide the secondary user with an alternate access mechanism for secure print authentication for printing the electronic document as part of the print job created by the primary user based on a relationship between the primary user and the secondary user.

17. The apparatus of claim 16, wherein the processor is further configured to determine whether the secondary user is an authorized user for printing on a printer chosen by the primary user and wherein the subset of secured print jobs comprises all secure print jobs on the printer when it is determined that the secondary user is an authorized user, the secure print jobs displayed for selection with primary user information for each of the secure print jobs.

18. The apparatus of claim 17, wherein the subset comprises secured print jobs enabled for printing by unauthorized users when it is determined that the secondary user is not an authorized user, the secured print jobs displayed for selection with no information associated with the primary user.

19. The apparatus of claim 17, wherein the processor is further configured to determine whether the secondary user is included in a first list of pre-approved additional users for printing electronic documents as part of print jobs created by the primary user, and wherein a print job release request notification is sent to the primary user when it is determined that the secondary user is not included in the first list.

20. The apparatus of claim 16, wherein the relationship between the primary user and the secondary user comprises inclusion of the secondary user on a second list of pre-approved additional users for printing print jobs created by the primary user and wherein the alternate access mechanism for secure print authentication is provided to the secondary user when the secondary user is not included in the second list.

* * * * *

UNITED STATES PATENT AND TRADEMARK OFFICE
CERTIFICATE OF CORRECTION

PATENT NO. : 10,579,313 B1  
APPLICATION NO. : 16/364828  
DATED : March 3, 2020  
INVENTOR(S) : Vinothraja Packirisamy et al.

Page 1 of 1

It is certified that error appears in the above-identified patent and that said Letters Patent is hereby corrected as shown below:

On the Title Page

Item (73), Assignee: "Zerox Corporation" should read "Xerox Corporation".

Signed and Sealed this
Eighteenth Day of August, 2020

Andrei Iancu
*Director of the United States Patent and Trademark Office*